United States Patent
Albin Lambertine Petit et al.

(10) Patent No.: US 7,474,417 B2
(45) Date of Patent: Jan. 6, 2009

(54) METHOD FOR ESTIMATING AT LEAST ONE COMPONENT PLACEMENT POSITION ON A SUBSTRATE AS WELL AS A DEVICE FOR CARRYING OUT SUCH A METHOD

(75) Inventors: Rita Marguerite Albin Lambertine Petit, KR Eindhoven (NL); Alain de Bock, La Veldhoven (NL); Johannes Martinus Maria Verbakel, La Veldhoven (NL)

(73) Assignee: Assembleon N.V., La Veldhoven (NL)

( * ) Notice: Subject to any disclaimer, the term of this patent is extended or adjusted under 35 U.S.C. 154(b) by 278 days.

(21) Appl. No.: 11/055,013

(22) Filed: Feb. 11, 2005

(65) Prior Publication Data

US 2005/0216104 A1    Sep. 29, 2005

(30) Foreign Application Priority Data

Feb. 13, 2004    (EP)    .................... 04100567

(51) Int. Cl.
*G01B 11/14*    (2006.01)
*G05B 19/18*    (2006.01)

(52) U.S. Cl. ........................ 356/614; 700/56
(58) Field of Classification Search ................ 356/614; 700/56

See application file for complete search history.

(56) References Cited

U.S. PATENT DOCUMENTS

| | | | |
|---|---|---|---|
| 5,113,535 A | * | 5/1992 | Hedges et al. ................. 2/424 |
| 5,549,716 A | * | 8/1996 | Takahashi et al. ........... 29/25.01 |
| 5,840,594 A | * | 11/1998 | Tsubouchi et al. ............. 438/15 |
| 6,538,425 B1 | * | 3/2003 | Kawada .................... 324/158.1 |
| 6,938,335 B2 | * | 9/2005 | Kuribayashi et al. ........... 29/834 |
| 2004/0098857 A1 | * | 5/2004 | Kawada ........................ 29/740 |
| 2004/0151363 A1 | * | 8/2004 | Villain ......................... 382/151 |
| 2004/0184654 A1 | * | 9/2004 | Villain ......................... 382/151 |

OTHER PUBLICATIONS

"Visual Servoing in PCB Manufacturing", F. de Jong and P.P. Jonker (Proc. ASCI 2000, 6th Annual Conference of the Advanced School for Computing and Imaging, ASCI, Delft, 2000, eds. J.J. van Vliet, J.W.J. Heijnsdijk, T. Kielman and P.M.W. Knijnenburg, pp. 59-63) ("Jong").*

* cited by examiner

*Primary Examiner*—Patrick Connolly
*Assistant Examiner*—Jonathan Skovholt
(74) *Attorney, Agent, or Firm*—Foley & Lardner LLP

(57) ABSTRACT

A method and a device are provided for estimating at least one component placement position on a substrate at which a component is to be placed. The component placement position is estimated on the basis of the position of at least one mark on the substrate. The statistical measurement inaccuracies of the marks are determined. Subsequently, the positional accuracy of the component placement position on the substrate is estimated on the basis of the measurement inaccuracies of the marks. Subsequently, the estimated positional accuracy of the component placement position is compared with a desired positional accuracy. Subsequently, a determination is made regarding whether the component is to be placed on the substrate with the estimated positional accuracy of the component placement position.

14 Claims, 4 Drawing Sheets

METHOD FOR ESTIMATING AT LEAST ONE COMPONENT PLACEMENT POSITION ON A SUBSTRATE AS WELL AS A DEVICE FOR CARRYING OUT SUCH A METHOD

CROSS-REFERENCE TO RELATED APPLICATIONS

This application claims priority to EP 04100567.9, which was filed on Feb. 13, 2004 and which is incorporated by reference herein in its entirety.

BACKGROUND OF THE INVENTION

The invention relates to a method for estimating at least one component placement position on a substrate at which a component is to be placed; the component placement position is estimated on the basis of a position of at least one mark on the substrate. The invention also relates to a device suitable for carrying out such a method.

According to a conventional method, which is described in EP-A1-0 042 977, the position of a number of marks on a substrate are measured and are compared to the marks' expected positions. Based on differences between the marks' measured and expected, a transformation is applied to the expected or theoretical component placement positions on the substrate at which components are to be placed. As a result, corrections may be made for errors that may occur as a result of, for example, misalignment of a substrate in a component placement device, stretch of the substrate, etc.

In the last few decades, the components to be placed have become increasingly smaller. Moreover, these smaller components must be positioned on the substrate with ever increasing precision. If the component placement position is determined relatively inaccurately, the result will be an incorrect placement of the component at the component placement position and, in turn, the substrate will be rejected during a subsequent process.

What is needed, therefore, is an apparatus and a methodology that address at least one if not more of the deficiencies that afflict conventional practice, as previously described.

SUMMARY OF THE INVENTION

An object of the invention is to provide a method that makes it possible to estimate the accuracy of the placement of a component at a component placement position on a substrate. The component placement position is estimated on the basis of the position of at least one mark on the substrate. This object may be accomplished according to a method embodiment of the present invention. This method includes, among other possible steps: (a) determining statistical measurement inaccuracies of the marks; (b) estimating, on the basis of the measurement inaccuracies of the marks, the positional accuracy of the component placement position on the substrate; (c) comparing the estimated positional accuracy of the component placement position with a desired positional accuracy; and (d) determining whether the component is to be placed on the substrate with the estimated positional accuracy of the component placement position.

Upon determination of the position of the marks on a substrate in a component placement device by means of, for example, an optical camera, measurement inaccuracies may occur and may be statistically determined. With the aforementioned method, the positional accuracy of each component placement position may be estimated on the basis of the statistical measurement inaccuracies of each mark and compared with a predetermined, desired (hereinafter simply "desired") positional accuracy. In this way it is possible to estimate the probability that the component will be placed at the desired component placement position prior to the placement of a component at a component placement position.

If the estimated positional accuracy is lower than the desired positional accuracy, additional measures may be taken to ensure that the component will nevertheless be placed at the component placement position with a desired degree of accuracy. If the estimated positional accuracy is significantly higher than the desired positional accuracy but the estimated positional accuracy is lower than the desired positional accuracy (for a number of other component placement positions), it may be decided, for example, to use other signs on the substrate as marks relative to selected marks, if possible, the estimated positional accuracy of all component placement positions may be higher than the desired positional accuracy. As a result, it is possible to: (a) estimate the chance of a component being incorrectly placed at a component placement position before the placement takes place; and (b) minimize the likelihood of such an error by enabling a user to undertake additional accuracy measures.

According to an embodiment of the method, at least one other mark may be selected, if the estimated positional accuracy is lower than the desired positional accuracy. As a result, the estimated positional accuracy may become higher than the desired positional accuracy. By selecting at least one other mark, relative to which the estimated positional accuracy is higher than the desired positional accuracy, it may become possible to take measures to avoid the risk of a component being incorrectly placed at a component placement position before placement of a component at the component placement position, thereby reducing the risk of a component being incorrectly placed at a component placement position.

According to another embodiment of the method, the estimated positional accuracy may be communicated to a user, if the estimated positional accuracy is lower than the desired positional accuracy. As a result, the user of a component placement device in which such a method can be implemented may be able to adjust the positional accuracy for each component placement position, if desired, or may pay extra attention after placement when checking whether the desired accuracy has been realized.

According to another embodiment of the method, the component placement position may be determined by means of at least one mark located relatively close to the component placement position, if the estimated positional accuracy is lower than the desired positional accuracy. If the desired positional accuracy is relatively high, it may be necessary to determine for that particular component placement position the position relative to a mark that is located relatively close to the component placement position. The mark may also be the component placement position itself, if desired.

According to another embodiment of the method, the position(s) of the mark(s) as well as the component placement positions on the substrate may be selected (on the basis of the expected inaccuracies in the measurement of marks, the statistically determined inaccuracies that occur upon alignment of a component in a component placement device, and the statistically determined inaccuracies that occur upon placement of the component on the substrate) in such a manner that the desired positional accuracy may be lower than the estimated positional accuracy for each component placement position. As a result, adjustments may be made not only for the expected inaccuracies in the measurement of marks, but also for other inaccuracies (which are to be statistically determined) in a component placement machine, upon estimation of the positional accuracy of component placement positions. As a result, the positional accuracy of the component placement positions may be determined with a relatively high degree of accuracy. If the desired positional accuracies are higher than the estimated positional accuracies, the positions of the marks and also of the component placement position on the substrate may be adjusted before the component is placed on the substrate and, if desired, even before designing substrate.

Another embodiment of the invention addresses a device suitable for estimating at least one component placement position on a substrate at which a component is to be placed. This device includes, among other possible things: (a) an input unit for inputting: (i) at least one position of a mark; (ii) statistical measurement inaccuracies of each mark; and (iii) at least one component placement position on a substrate; and (b) a processing unit configured to estimate, on the basis of the statistical measurement inaccuracies of the marks, the positional accuracy of each component placement position on the substrate. The device is configured to compare the estimated positional accuracy with a desired positional accuracy.

These and other features, aspects, and advantages of the present invention will become more apparent from the following description, appended claims, and accompanying exemplary embodiments shown in the drawings.

DETAILED DESCRIPTION OF PREFERRED EMBODIMENTS

Figure 1:
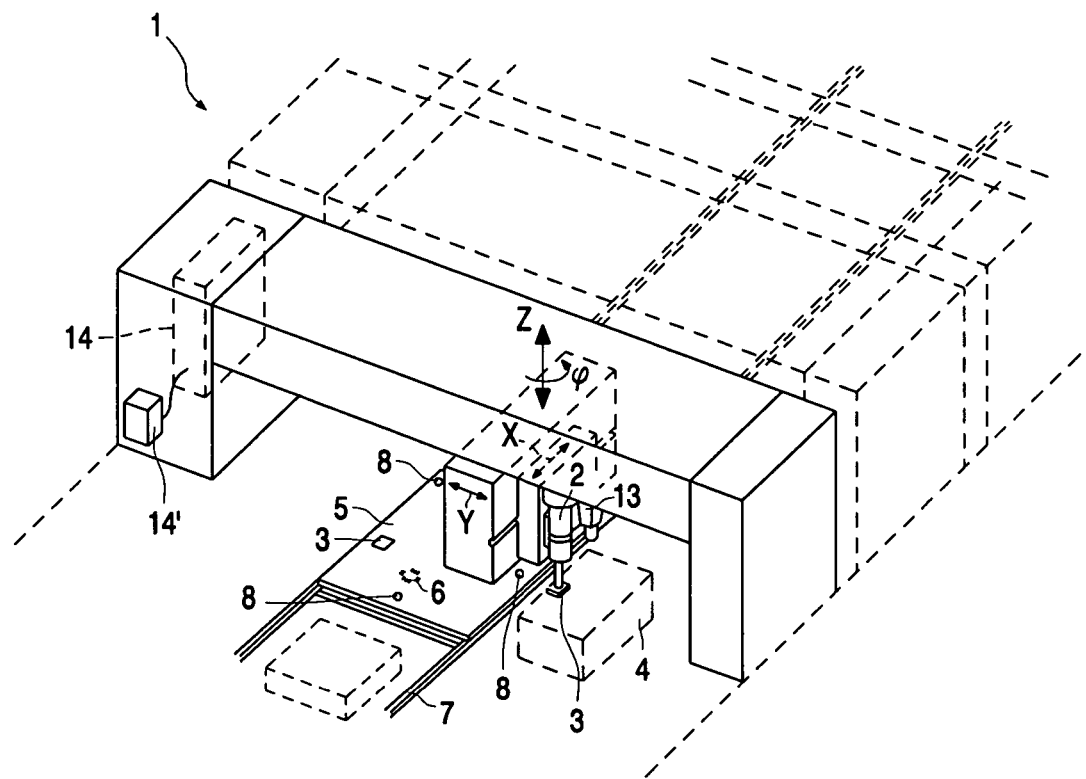
FIG. 1 is a perspective view of an embodiment of a component placement device according to the present invention that is useful in placing a component on a substrate at a desired location.

Presently preferred embodiments of the invention are illustrated in the drawings. An effort has been made to use the same, or like, reference numbers throughout the drawings to refer to the same or like parts.

Figure 2:
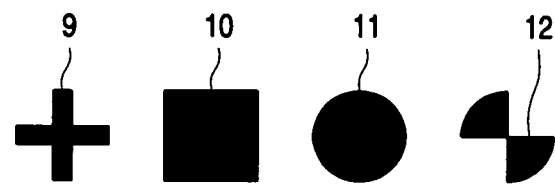
FIG. 2 shows a number of different signs suitable for use as marks, which may be applied to the substrate shown in FIG. 1.

FIG. 1 shows a component placement device 1 that includes a component pickup unit 2 that is movable in X-direction and in Y-direction, by means of which a component 3 can be moved from a component supply unit 4 to a desired component placement position 6 on a substrate 5. The substrate 5 is carried through the component placement device 1 in the X-direction by means of a transport guide 7. To determine the position of the substrate 5 with respect to the transport guide 7 and with respect to the component pickup device 2, the substrate 5 is provided with a number of marks 8 that form a conductor pattern. As shown in FIG. 2, the marks 8 may be, for example, in the form of a cross 9, a square 10, a circle 11, a part of a circle 12, or other suitable shape. Further, although the number of marks 8 may typically be two or three, a larger or a smaller number of marks may be used in other embodiments.

The marks 8 are sensed by a camera 13 disposed beside the component pickup unit 2. Subsequently, the actual positions of the marks 8 relative to the component placement unit 2 are calculated, by a processor 14, on the basis of the images recorded by means of the camera 13. In addition, the expected positions of the marks 8 relative to the component placement unit 2 are also determined by the processor 14. Finally, using the actual and expected positions of the marks 8, the processor 14 can determine (and store) component placement positions, at which components are eventually to be placed. Moreover, the processor 14 determines the component placement positions relative to the component placement unit 2 on the basis of the measured positions of the marks, after which a desired component 3 is placed at the component placement position 6 in question by means of the component placement unit 2. The structure of the aforementioned component placement device 1 is typical of conventional placement devices and, therefore, will not be described in further detail.

In contrast to conventional component placement devices, the component placement device 1 according to the present invention is provided with a device for determining, prior to the placement of components 3 on the substrate 5, whether it is possible to realize a desired positional accuracy of a chosen component placement position 6. The device comprises the processor 14 as well as an input unit 14' for inputting statistical data regarding measurement inaccuracies of the marks 8. Whether the desired positional accuracy can be realized (and a component can be placed at the component placement position 6 with a sufficient degree of accuracy) depends, among other things, on: (a) the accuracy with which the positions of the marks 8 can be determined; (b) the accuracy with which the component 3 can be aligned with respect to the component placement unit 2 and the camera 13; (c) the accuracy with which the component 3 can be transported from the component supply device 4 to the component placement position 6; (d) machine wear; (e) vibrations, etc.

Using the input 14' and a method according to the present invention (hereafter described in detail), an estimate of the positional accuracy of the component placement position 6 (and consequently an estimate of the accuracy with which a component can be positioned at the component placement position) may be made before placement of the component takes place.

Model for inaccuracies in the marks' positions when three marks 8 are used:

Where three marks will be sensed (by means of the camera 13), a linear model of the deformation and the movement of the substrate 5 (and the marks 8 present thereon) can be used for transforming the measured positions of the marks 8 relative to their expected positions. Errors in the determination of the position of the marks 8 by the camera 13 are exactly reproduced for each mark 8 by means of such a linear model.

The position Q of a random component placement position 6 can be written in terms of the positions of the marks 8 by means of the following formula:

$$\text{Formula A:} \quad Q = \sum_{i=0}^{2} (\alpha_i * P_i); \quad \sum_{i=0}^{2} \alpha_i = 1$$

In formula A, Q is the position of the component placement position 6 and $P_0$, $P_1$ and $P_2$ are the positions of the three marks 8.

The positional accuracy $\sigma_Q$ can be derived by means of the error propagation formula as described in, for example, "Mathematical Statistics and Data Analysis" by J. A. Rice. On the basis of this formula, it can be determined that the statistical error $s_a$ in the position Q of the component placement position 6 equals the following formula:

$$\text{Formula B:} \quad \sigma_Q = \sqrt{\sum_{i=0}^{2}(\alpha_i^2 * \sigma_{P_i}^2)}$$

In formula B, $\sigma_{pi}$ is the σ-value of the statistical measurement inaccuracy of mark i. Each mark i has its own $\sigma_{pi}$-value, determined by measuring one and the same mark i on a number of different similar substrates 5.

Figure 3A:
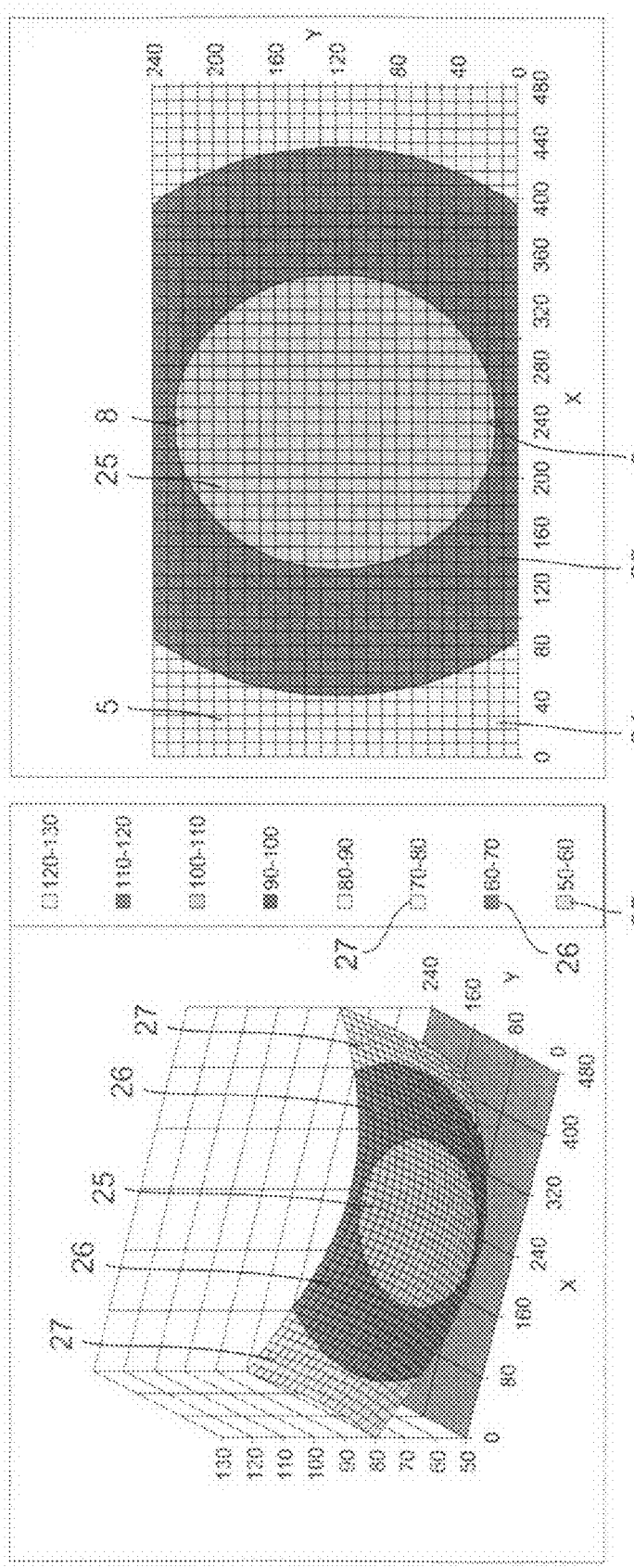
FIGS. 3A-3C respectively show three-dimensional (FIGS. 3A1, 3B1, 3C1) and two-dimensional (FIGS. 3A2, 3B2, 3C2) diagrams of estimated inaccuracies for a substrate comprising: (a) three marks; (b) two marks sensed by the component placement device without anisotropy; and (c) two marks sensed by the component placement device with anisotropy.

FIG. 3A shows a three-dimensional (FIG. 3A1) and a corresponding two-dimensional (FIG. 3A2) diagram in which the estimated positional accuracy is shown for an entire substrate 5. It is apparent from FIG. 3A that: (a) the positional accuracy is 50-60 μm in the region 21 defined by the marks 8; (b) the positional accuracy is 60-70 μm in a surrounding region 22; (c) the positional accuracy is 70-80 μm in the region next surrounding region 22; and (d) the positional accuracy is 80-90 μm in the left-hand bottom corner 23 of the substrate 5. By means of the processor 14 that forms part of the device according to the invention it is determined whether the desired positional accuracies of the component placement positions in the regions 21-24 are higher or lower than the expected positional accuracies in the regions 21-24.

If the estimated positional accuracy is lower than the desired positional accuracy for a particular component placement position, a number of solutions are possible. If the desired positional accuracy for the component placement position in question cannot be realized for the specific substrate, the available marks, the available component placement device, and/or the selected model, the user can be alerted to this and the realized positional accuracy can be checked afterwards. In such cases in which the desired accuracy has not been realized, the substrate can be corrected manually.

It is also possible to use other signs on the substrate 5 as marks 8; such signs may be secondary marks specifically provided on the substrate 5 for that purpose, as shown in FIG. 2, for example. It is also possible, however, to use parts of the conductor pattern that is present on the substrate 5.

Furthermore, for a specific component placement position at which a component is to be placed, it is possible to record a separate image of the region near the component placement position (or of the component placement position itself) by means of, for example, the camera 13 with a very high degree of precision. As a result of such an image, the location of the component placement position relative to the component placement unit 2 may subsequently be determined. This is time-consuming, however, and will only be desirable for a limited number of components that are to be placed with a relatively high degree of precision.

In the previously described method, it is not only the measurement inaccuracies that may occur upon measurement of the positions of the marks that have been taken into account. According to the method, the overall component placement accuracy $CPA_Q$ at component placement position 6 (position Q) may be determined by means of the following formula:

$$CPA_Q = FIX + \sqrt{\sigma_Q^2 + OTH^2} \quad \text{Formula C}$$

In formula C, FIX indicates an error that can be determined from measurements of a respective component placement device and that may occur with all components; such an error may be caused, for example, by calibration errors. The letters OTH indicate errors that are specific for a particular component and a particular component placement position Q; such errors OTH may, for example, depend on the alignment of a component 3 with respect to the component pickup unit 2 as well as the statistically determined errors that occur when the component 3 is being moved from the component supply device 4 to the component placement position 6.

Models for inaccuracies in the positions of marks when two marks are used:

Although it is preferable to use three marks, in some embodiments only two marks 8 (which can be sensed by the camera 13) may be present on a substrate 5. The position Q of the component placement position 6 is now expressed in terms of the positions $P_0$ and $P_i$ of the two marks 8 according to the following formula:

$$\text{Formula D:} \quad Q_x - P_{0,x} = \alpha_1 * (P_{1,x} - P_{0,x}) + \alpha_2 * (P_{1,y} - P_{0,y})$$

$$Q_y - P_{0,y} = \alpha_1 * (P_{1,y} - P_{0,y}) - \alpha_2 * (P_{1,x} - P_{0,x}); \quad \sum_{i=0}^{1} \alpha_i = 1$$

It is assumed in this connection that: (a) the transformation can be modeled by linear transformations; and (b) the fit of the transformation equals the measured positions of the marks.

On the basis of the error propagation formula D, the statistical errors in the position Q of the component placement position 6 may be obtained by the following formula:

Formula E: $\sigma_{x,Q} =$ $$\sqrt{(1-\alpha_1)^2 * \sigma_{x,P_0}^2 + \alpha_1^2 * \sigma_{x,P_1}^2 + \alpha_2^2 * \sigma_{y,P_0}^2 + \alpha_2^2 * \sigma_{y,P_1}^2}$$

$$\sigma_{y,Q} = \sqrt{\alpha_2^2 * \sigma_{x,P_0}^2 + \alpha_2^2 * \sigma_{x,P_1}^2 + (1-\alpha_1)^2 * \sigma_{y,P_0}^2 + \alpha_1^2 * \sigma_{y,P_1}^2}$$

Assuming that the X-value and the Y-value of the statistical errors of the marks 8 are equal, the statistical errors or statistical measurement inaccuracies of each mark may be obtained from the following formula:

$$\sigma_{x,Q} = \sigma_{y,Q} = \sqrt{((1-\alpha_1)^2 + \alpha_2^2) * \sigma_{P_0}^2 + (\alpha_1^2 + \alpha_2^2) * \sigma_{P_1}^2} \quad \text{Formula F}$$

Figure 3B:
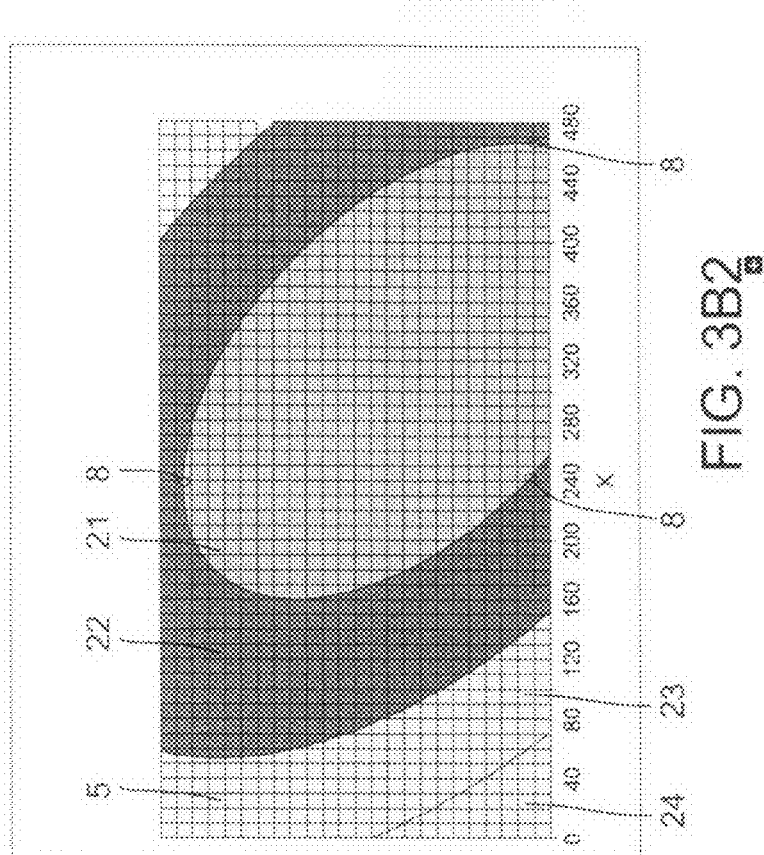
Figure 3B:
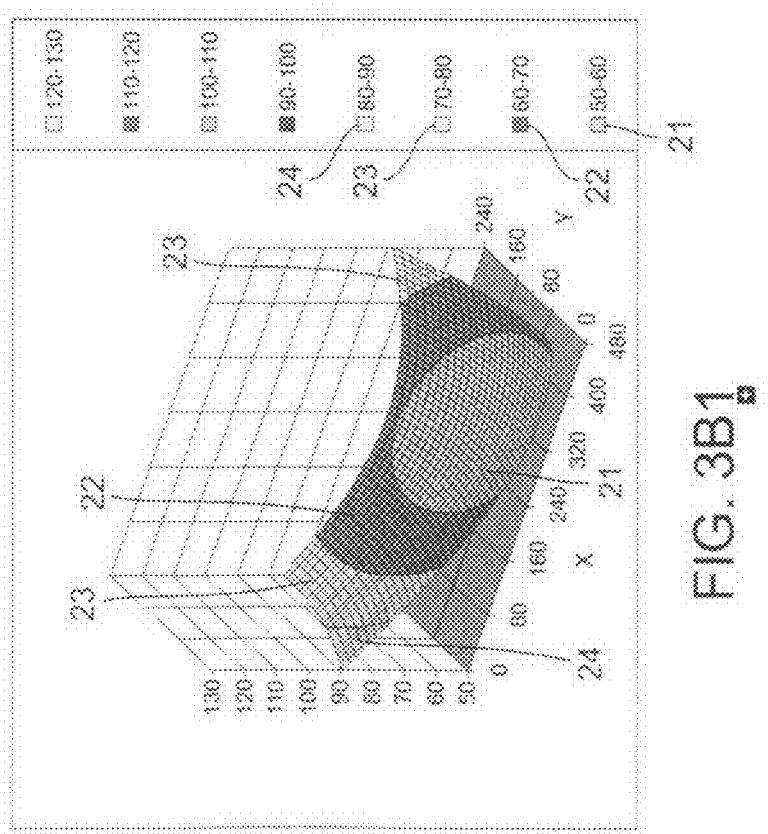

FIG. 3B shows a three-dimensional (FIG. 3B1) and a corresponding two-dimensional (FIG. 3B2) diagram of the estimated positional accuracy over an entire substrate 5, which substrate 5 is provided with two marks 8. In a region 25 between the marks 8, the positional accuracy of the component placement positions is 50-60 μm, for example. In a region 26 surrounding the region 25, the accuracy is 60-70 μm. In a region 27 surrounding the region 26 the positional accuracy is 70-80 μm. On the basis of these diagrams, the processor 14 can determine whether it is possible to realize the desired positional accuracy at all positions on the substrate 5.

In the embodiment of FIG. 3B, no allowance is made for a possible anisotropic error that may occur in the case of anisotropic stretch (i.e., where the amount of stretch $s_x$ in the X-direction does not equal the amount of stretch $s_y$ in the Y-direction) between the substrate and the component placement device 1. Anisotropy $j_x$, $j_y$ may also occur in the case of a rotated position of the substrate 5 relative to the X—Y coordinate system of the component placement device 1, i.e., if the substrate has deformed to the shape of a parallelogram in comparison with an expected rectangular shape of the substrate.

To model the anisotropic error, it is possible, for example, to calculate the difference between the outcome of an actual anisotropic transformation and the transformation of the isotropic model. To calculate the anisotropic error in the position Q of the component placement position 6, it is assumed that the transformations have been modeled by linear transformation and that the outcome of the transformation for the marks 8 equals the measured positions of the marks 8, i.e., in this model the measurement inaccuracies of the marks 8 is equated to zero. The anisotropic error AnisQ can then be determined by means of the following formula:

$$\text{Formula G: } Anis_Q = \beta * \left( (h_{22} - h_{11}) * \begin{pmatrix} F_y \\ F_x \end{pmatrix} + (h_{12} + h_{21}) * \begin{pmatrix} F_x \\ -F_y \end{pmatrix} \right)$$

In formula G, $F_x$ and $F_y$ are the X-portion and the Y-portion, respectively, of the normalized difference vectors of the two marks: $P_1 - P_0$. $\beta$ represents the distance from the position Q to the line between the two marks 8. $h_{22}, h_{11}, h_{12}$ and $h_{21}$ are the elements of the transformation matrix H for transforming the expected positions of the marks 8 to the measured positions of the marks 8.

As is apparent from formula G, the anisotropic error at position Q is linear with the distance $\beta$ to the line through the marks 8. The anisotropic error can be estimated by removing second-order terms by making use of the stretch anisotropy $s_y$-$s_x$ and the rotation anisotropic $j_y$-$j_x$, which anisotropic error $Anis_Q$ is shown in the following formula:

$$\text{Formula H: } Anis_Q = \beta * \left( (s_y - s_x) * \begin{pmatrix} F_y \\ F_x \end{pmatrix} + (\varphi_x - \varphi_y) * \begin{pmatrix} F_x \\ -F_y \end{pmatrix} \right)$$

Moreover, the absolute value of the anisotropic error is shown in the following formula:

$$|Anis_Q| = \beta * \sqrt{((s_y - s_x)^2 + (\varphi_x - \varphi_y)^2)} \quad \text{Formula J:}$$

Figure 3C:
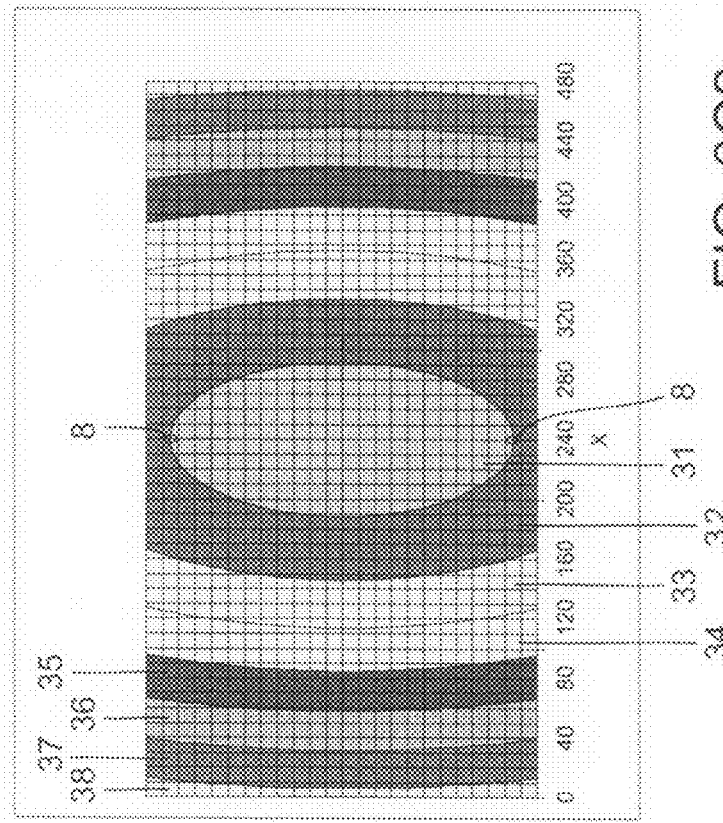
Figure 3C:
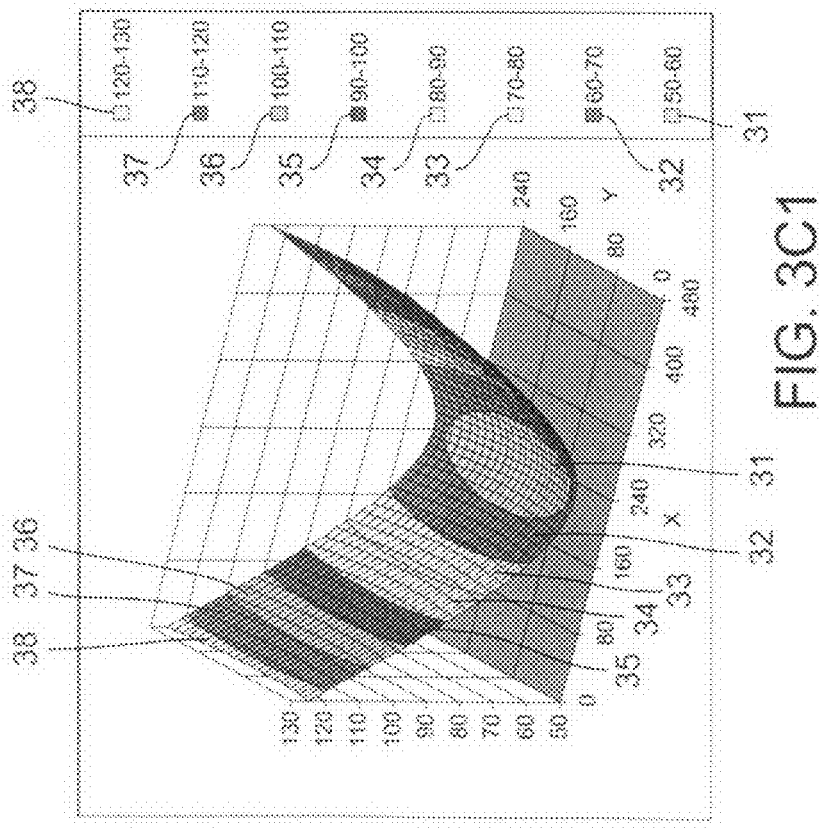

FIG. 3C shows a three-dimensional (FIG. 3C1) and a corresponding two-dimensional (FIG. 3C2) diagram in which the expected positional inaccuracies are plotted for a substrate 5 that has undergone anisotropic stretching with respect to the component placement device 1, wherein $j_x = j_y = 0$ and $s_x = s_y = 0.0004$. As shown in FIG. 3C, a positional accuracy of 50-60 μm can be realized in the region 31 bounded by the marks 8, whereas a positional accuracy not higher than 120-130 μm can be realized in the region 38 located furthest away from the marks 8.

The overall component placement accuracy $CPA_Q$ (in the case of a substrate 5 on which two marks 8 can be measured) is defined by the following formula:

$$CPA_Q = |Anis_Q| + FIX + \sqrt{\sigma_Q^2 + OTH^2} \quad \text{Formula K:}$$

Formula K differs from formula C (which is for three marks 8) in that formula K also accounts for the absolute value of the anisotropic error.

In practice, it is preferable to continuously compare the estimated component placement accuracy $CPA_Q$ with the desired component placement accuracy, thereby enabling a user to take any necessary measures to ensure that the components will be positioned at the component placement position with the desired degree of accuracy before placement of the components on a substrate actually takes place.

The selection of the marks and also of the component placement position can be optimized on the basis of, for example, "the highest possible positional accuracies" or the "lowest allowable desired positional accuracies". The latter case is open to other optimization criteria such as, for example, the rate at which components are placed on a substrate, greater freedom of design for a substrate, etc. It is also possible in this connection to divide the substrate into segments, in which case an optimum set of marks may be determined for each segment.

The previously described method embodiment is suitable for: (a) assessing the risks of incorrect placement of components in advance; (b) optimizing the selection of marks on the substrate; (c) optimizing the design of a substrate independent of a component placement machine on which the substrate is to be provided, etc.

It is also possible, in some embodiments, to configure the device according to the invention as a separate device, which may be separated from the component placement device.

It is also possible, in some embodiments, to use the method for monitoring the overall component placement process, in which case a user may be provided with information about, for example, the accuracy with which each component can be placed.

Although the aforementioned describes embodiments of the invention, the invention is not so restricted. It will be apparent to those skilled in the art that various modifications and variations can be made to the disclosed embodiments of the present invention without departing from the scope or spirit of the invention. Accordingly, these other apparatuses and methods are fully within the scope of the claimed invention. Therefore, it should be understood that the apparatuses and methods described herein are illustrative only and are not limiting upon the scope of the invention, which is indicated by the following claims.

What is claimed is:

1. A method for estimating at least one component placement position on a substrate at which a component is to be placed, wherein the component placement position is estimated on the basis of a position of at least one mark on the substrate, the method comprising the steps of:
   determining statistical measurement inaccuracies of the at least one mark by measuring one mark at a corresponding location on each of a plurality of substrates;
   estimating, on the basis of the statistical measurement inaccuracies of the at least one mark, the positional accuracy of the component placement position on the substrate;
   comparing the estimated positional accuracy of the component placement position with a desired positional accuracy; and
   determining whether the component is to be placed on the substrate with the estimated positional accuracy of the component placement position.

2. The method according to claim 1, wherein, if the estimated positional accuracy is lower than the desired positional accuracy: (a) the at least one other mark is selected; and (b) the estimated positional accuracy becomes higher than the desired positional accuracy.

3. The method according to claim 1, wherein, if the estimated positional accuracy is lower than the desired positional accuracy, the estimated positional accuracy is communicated to a user.

4. The method according to claim 1, wherein, if the estimated positional accuracy is lower than the desired positional accuracy, the component placement position is determined by means of at least one mark located relatively close to the component placement position.

5. The method according to claim 1, wherein at least one of the marks is a secondary mark.

6. The method according to claim 5, wherein the secondary mark is used in the step of determining whether the component is to be placed on the substrate.

7. The method according to claim 5, wherein the secondary mark is part of a pattern of conductors on the substrate on which the component is to be placed.

8. The method according to claim 1, wherein the step of estimating the positional accuracy comprises the step of:
using an error propagation formula.

9. The method according to claim 1, wherein the step of estimating the positional accuracy comprises the step of:
taking in account statistically determined inaccuracies that occur upon alignment of a component in a component placement device.

10. The method according to claim 1, wherein the step of estimating the positional accuracy comprises the step of:
taking into account statistically determined inaccuracies that occur upon placement of a component on a substrate.

11. The method according to claim 1, wherein two marks are used.

12. The method according to claim 11, wherein the step of estimating the positional accuracy comprises the step of:
taking into account an estimated anisotropic error.

13. The method according to claim 1, wherein the position of the at least one mark and the component placement positions on the substrate are selected:
(i) on the basis of:
(a) the expected inaccuracies in the measurement of marks;
(b) the statistically determined inaccuracies that occur upon alignment of a component in a component placement device; and
(c) the statistically determined inaccuracies that occur upon placement of the component on the substrate, and
(ii) so that the desired positional accuracy is lower than the estimated positional accuracy for each component placement position.

14. A device suitable for estimating at least one component placement position on a substrate at which a component is to be placed, the device comprising:
an input unit for inputting:
(i) at least one position of a mark;
(ii) statistical measurement inaccuracies of each mark by measuring one mark at a corresponding location on each of a plurality of substrates; and
(iii) at least one component placement position on a substrate; and
a processing unit configured to estimate, on the basis of the statistical measurement inaccuracies of the marks, the positional accuracy of each component placement position on the substrate,
wherein the device is configured to compare the estimated positional accuracy with a desired positional accuracy.

* * * * *